(12) United States Patent
Zhao

(10) Patent No.: US 12,025,878 B2
(45) Date of Patent: Jul. 2, 2024

(54) ARTICLE FOR DISPLAY DEVICE AND DISPLAY SYSTEM

(71) Applicant: 3M INNOVATIVE PROPERTIES COMPANY, St. Paul, MN (US)

(72) Inventor: Feng Zhao, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/195,481

(22) Filed: May 10, 2023

(65) Prior Publication Data
US 2023/0273476 A1    Aug. 31, 2023

Related U.S. Application Data

(63) Continuation of application No. 17/758,754, filed as application No. PCT/CN2020/072946 on Jan. 19, 2020, now Pat. No. 11,686,971.

(51) Int. Cl.
*G02F 1/1335* (2006.01)
*G02F 1/1347* (2006.01)

(52) U.S. Cl.
CPC .. *G02F 1/133536* (2013.01); *G02F 1/133504* (2013.01); *G02F 1/1347* (2013.01)

(58) Field of Classification Search
CPC ......... G02F 1/133536; G02F 1/133504; G02F 1/1347
See application file for complete search history.

(56) References Cited

U.S. PATENT DOCUMENTS

| 2009/0161072 A1 | 6/2009 | Yamauchi |
| 2009/0190237 A1 | 7/2009 | Silverstein et al. |
| 2014/0240828 A1 | 8/2014 | Robinson et al. |
| 2015/0212239 A1* | 7/2015 | Park ................... G02B 5/3058 216/24 |
| 2017/0082895 A1* | 3/2017 | Sakai .................. G02B 5/3041 |

FOREIGN PATENT DOCUMENTS

| CN | 1350648 A | 5/2002 |
| CN | 1961250 A | 5/2007 |
| CN | 207232583 U | 4/2018 |
| CN | 105973467 B | 5/2018 |
| CN | 105324605 B | 4/2020 |
| JP | 2004037944 A | 2/2004 |

(Continued)

OTHER PUBLICATIONS

International Search Report for PCT International Application No. PCT/CN2020/072946, mailed on Oct. 13, 2020, 5 pages.

*Primary Examiner* — Donald L Raleigh
(74) *Attorney, Agent, or Firm* — Robert S. Moshrefzadeh

(57) ABSTRACT

An article for a display device having an output surface. The article includes a light valve, a reflective polarizer, and a diffusing layer. The light valve is configured to be disposed on the output surface of the display device. The light valve is operable in a pass mode and a block mode. The reflective polarizer is disposed on the light valve opposite to the display device. The reflective polarizer is configured to substantially transmit light having a first polarization state and substantially reflect light having an orthogonal second polarization state. The diffusing layer is disposed on the reflective polarizer opposite to the light valve.

4 Claims, 7 Drawing Sheets

(56) References Cited

FOREIGN PATENT DOCUMENTS

| | | | |
|---|---|---|---|
| JP | 2004317908 | A | 11/2004 |
| JP | 2016191870 | A | 11/2016 |
| WO | 200057214 | A1 | 9/2000 |
| WO | 2005119353 | A1 | 12/2005 |
| WO | 2007069125 | A2 | 6/2007 |
| WO | 2016183059 | A1 | 11/2016 |
| WO | 2016184972 | A1 | 11/2016 |
| WO | 2019147762 | A1 | 8/2019 |

\* cited by examiner

ARTICLE FOR DISPLAY DEVICE AND DISPLAY SYSTEM

TECHNICAL FIELD

The present disclosure relates to articles for display devices, and display systems including such articles.

BACKGROUND

Displays are nowadays used as operational interfaces in various devices. For example, displays may be used in smart phones, tablets, AI (Artificial Intelligence) terminals, home appliances and other devices. Generally, the displays are surrounded by a frame. The displays when embedded in various devices, appear as black when they are in stand-by or power-off state, hence rendering obvious a contrast between the display and the frame and/or the whole device, thereby compromising the appearance of the devices. Therefore, it may be desirable to hide a contrast between the display and the frame and/or the whole device. One solution to hide the contrast includes using a cover of a similar color as the frame/device on the display. However, even when the cover is used, the display is very hard to blend with the frame and/or the whole device.

Another solution is provided by PCT Patent Publication number WO2007069125. WO2007069125 discloses a display system including a display device with a display screen for displaying an image. A diffuser is arranged in front of the display device. A controller controls at least a portion of the diffuser to be in a transparent state wherein the display screen is visible or in an opaque state for hiding the display screen. The controller also controls an illumination system to illuminate at least the portion of the diffuser when in the opaque state.

Hiding the contrast in WO2007069125 is achieved by controlling the diffuser states as transparent or opaque by the controller. However, the diffuser may be still light transmissive when it is in diffusive state. Therefore, only one diffuser layer may not be sufficient to hide the contrast between the display screen and the frame. Moreover, it may not be desirable to illuminate the diffuser in the opaque or off state.

It may therefore be desirable to have a display system that allows hiding a contrast between a display device and a frame surrounding the display device, and provides a uniform appearance when the display device is off.

SUMMARY

Generally, the present disclosure relates to articles for display devices and display systems. The present disclosure also relates to articles for display devices, display systems including such articles, and methods of manufacturing such articles.

Some embodiments of the present disclosure relate to an article for a display device having an output surface. The article includes a light valve, a reflective polarizer, and a diffusing layer. The light valve is configured to be disposed on the output surface of the display device. The light valve is operable in a pass mode and a block mode. The reflective polarizer is disposed on the light valve opposite to the display device. The reflective polarizer is configured to substantially transmit light having a first polarization state and substantially reflect light having an orthogonal second polarization state. The diffusing layer is disposed on the reflective polarizer opposite to the light valve.

In some embodiments, the light valve includes a liquid crystal light valve (LCLV).

In some embodiments, the LCLV includes a first polarizer, a second polarizer, and a liquid crystal layer. The first polarizer faces the display device and is configured to substantially transmit light having the second polarization state and substantially reflect or absorb light having the first polarization state. The second polarizer faces the reflective polarizer and is configured to substantially transmit light having the first polarization state and substantially reflect or absorb light having the second polarization state. The liquid crystal layer is disposed between the first polarizer and the second polarizer.

In some embodiments, the diffusing layer includes a coating sheet.

In some embodiments, the diffusing layer includes at least one of a diffusive coating layer and a polymer dispersed liquid crystal layer.

In some embodiments, the article further includes an optically clear adhesive bonding the reflective polarizer to the diffusing layer.

In some embodiments, the article further includes a transparent cover layer disposed on the diffusing layer.

In some embodiments, the transparent cover layer further includes a touch panel.

Some embodiments of the present disclosure relate to a display system including a display device for generating an image. The display device includes an output surface. The display system further includes an article. The article includes a light valve, a reflective polarizer, and a diffusing layer. The light valve is disposed on the output surface of the display device. The light valve is operable in a pass mode and a block mode. The reflective polarizer is disposed on the light valve opposite to the display device. The reflective polarizer is configured to substantially transmit light having a first polarization state and substantially reflect light having an orthogonal second polarization state. The diffusing layer is disposed on the reflective polarizer opposite to the light valve. The display system further includes a controller operable to at least switch the light valve between the pass mode and the block mode.

In some embodiments, the light valve includes a liquid crystal light valve (LCLV).

In some embodiments, the LCLV includes a first polarizer, a second polarizer, and a liquid crystal layer. The first polarizer faces the display device and is configured to substantially transmit light having the second polarization state and substantially reflect or absorb light having the first polarization state. The second polarizer faces the reflective polarizer and is configured to substantially transmit light having the first polarization state and substantially reflect or absorb light having the second polarization state. The liquid crystal layer is disposed between the first polarizer and the second polarizer.

In some embodiments, the diffusing layer includes a colored coating sheet.

In some embodiments, the diffusing layer includes at least one of a diffusive coating layer and a polymer dispersed liquid crystal layer.

In some embodiments, the controller is further operable to at least switch the diffusing layer between a transparent state and an opaque state.

In some embodiments, the display system further includes an optically clear adhesive bonding the display device to the article.

In some embodiments, the display system further includes an optically clear adhesive bonding the reflective polarizer to the diffusing layer.

In some embodiments, a cross-sectional area of the article is substantially equal to an area of the output surface of the display device.

Some embodiments of the present disclosure relate to a method of manufacturing an article for use with a display device having an output surface. The method includes providing a light valve configured to be disposed on the output surface of the display device. The light valve is operable in a pass mode and a block mode. The method further includes providing a reflective polarizer on the light valve opposite to the display device. The reflective polarizer is configured to substantially transmit light having a first polarization state and substantially reflect light having an orthogonal second polarization state. The method further includes providing a diffusing layer on the reflective polarizer opposite to the light valve.

In some embodiments, the light valve includes a first polarizer, a second polarizer, and a liquid crystal layer. The first polarizer faces the display device and is configured to substantially transmit light having the second polarization state and substantially reflect light having the first polarization state. The second polarizer faces the reflective polarizer and is configured to substantially transmit light having the first polarization state and substantially reflect light having the second polarization state. The liquid crystal layer is disposed between the first polarizer and the second polarizer.

In some embodiments, the diffusing layer includes a colored coating sheet.

In some embodiments, the diffusing layer includes at least one of a diffusive coating layer and a polymer dispersed liquid crystal layer.

In some embodiments, the further includes bonding the reflective polarizer to the diffusing layer by an optically clear adhesive.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to an article. The article may be used in various equipment that include displays. The article may be used in equipment that include displays as an operational interface. The display may have active display areas and non-active areas, such as a frame. The equipment may include smart phones, tablets, artificial intelligence (AI) terminals, home appliances and so forth. The article may hide contrast between the active display areas and the non-active areas when the display is in a stand-by mode or off, thereby providing a uniform display. Appearance of equipment, such as AI terminals and home appliances, may be significant and may require invisible displays when not in use. A uniform display may improve appearance of such equipment. The present disclosure also relates to a method of manufacturing the article for use with the display device.

Figure 1:
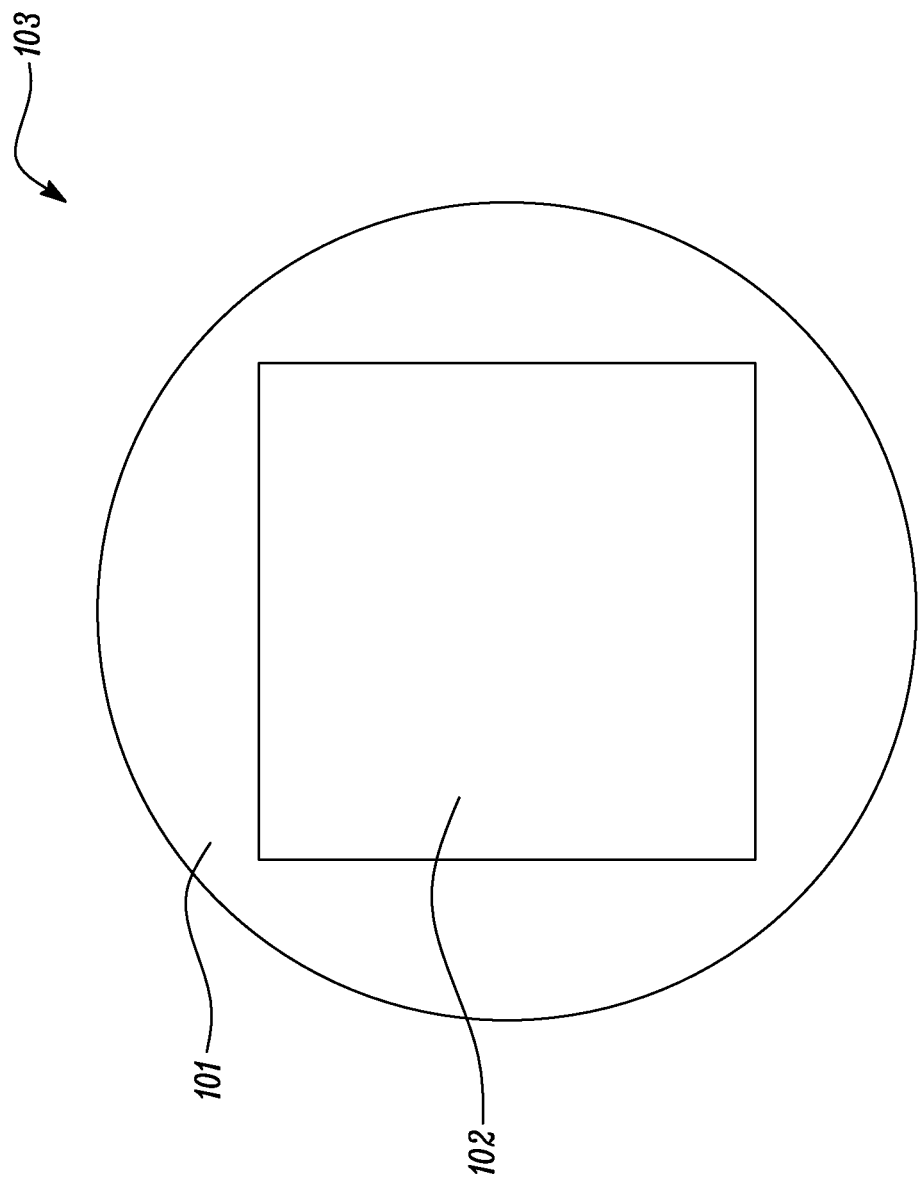
FIG. 1 is a top view of a display device having an output surface according to an embodiment of the present disclosure.

FIG. 1 is a top view of an exemplary display device 103. The display device 103 generates an image. In some embodiments, the display device 103 may be used in equipment, such as smart phones, personal digital assistants (PDAs), wearable devices, portable devices, artificial intelligence (AI) terminals, home appliances, or any other electronic device. In some embodiments, the display device 103 may be an operational interface. The display device 103 includes a non-active display area 101 and an active display area 102. The image is generated in at least a portion of the active display area 102. In some embodiments, the non-active display area 101 may be a frame surrounding the active display area 102. In some other embodiments, the non-active display area 101 may be a portion of the equipment which includes the display device 103.

Figure 2:
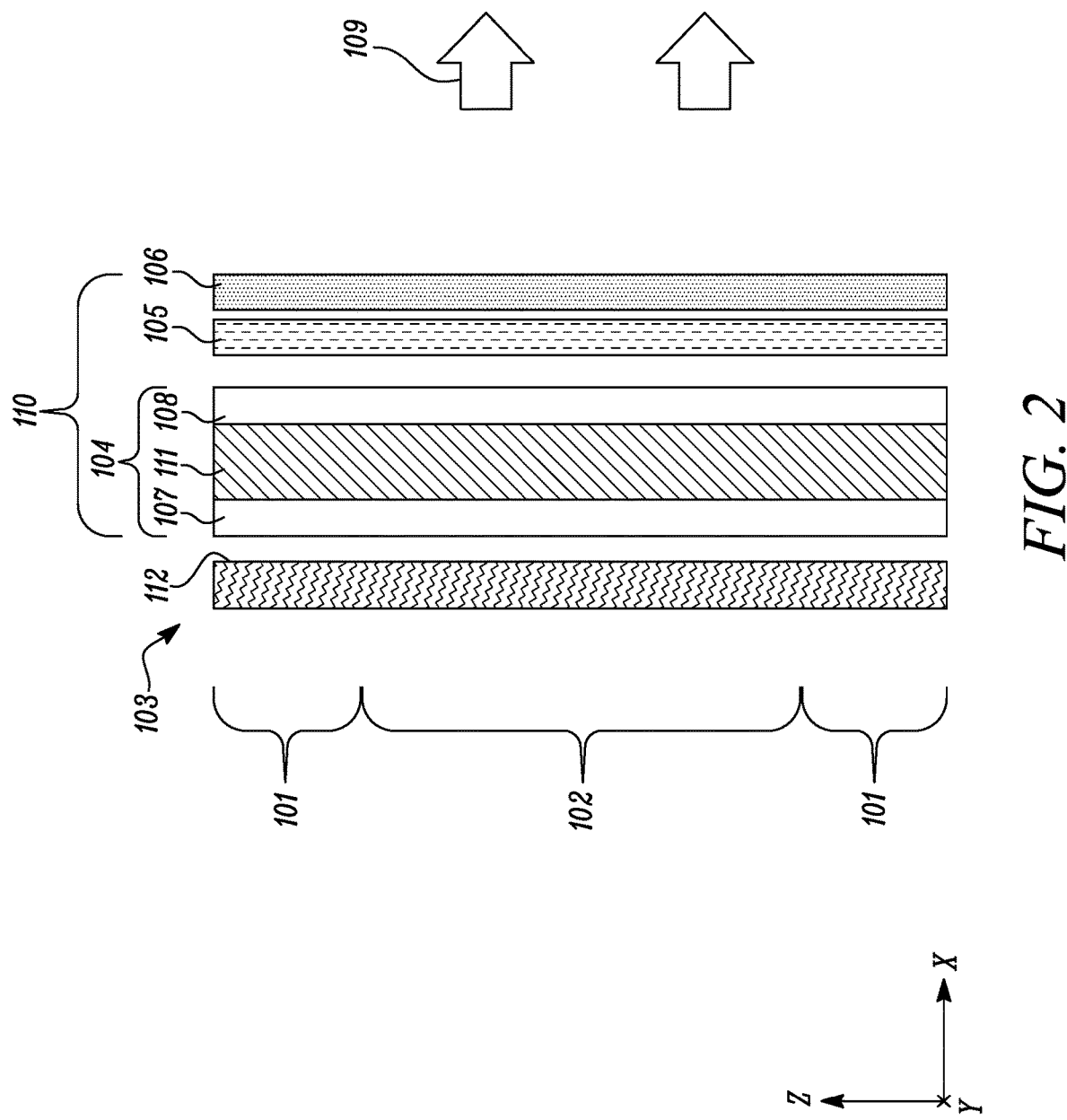
FIG. 2 illustrates an exploded cross-sectional view of an article and the display device according to an embodiment of the present disclosure.

Referring now to FIG. 2, an exploded cross-sectional view of an article 110 and the display device 103 is illustrated. The display device 103 has an output surface 112 facing a viewer or a user. The output surface 112 of the display device 103 includes the non-active display area 101 and the active display area 102. The active display area 102 emits light in a direction shown by arrow 109.

The article 110 is used with the display device 103. The article 110 includes a light valve 104, a reflective polarizer 105, and a diffusing layer 106.

The article 110 defines mutually orthogonal X, Y and Z-axes. The X and Y-axes are in-plane axes of the article 110, while the Z-axis is a transverse axis disposed along a thickness of the article 110. In other words, the X and Y-axes are disposed along a plane of the article 110, while the Z-axis is perpendicular to the plane of the article 110. The light valve 104, the reflective polarizer 105, and the diffusing layer 106 of the article 110 are disposed adjacent to each other along the Z-axis.

The light valve 104 is configured to be disposed on the output surface 112 of the display device 103. The light valve 104 is operable in a pass mode and a block mode. In some embodiments, the light valve 104 includes a liquid crystal light valve (LCLV). In some embodiments, the light valve 104 includes an electrochromic valve. The electrochromic valve is configured to change color or optical transmittance on application of a voltage. In some embodiments, the electrochromic valve is switchable between a transparent state and an opaque state.

The reflective polarizer 105 is disposed on the light valve 104 opposite to the display device 103. The reflective polarizer 105 is configured to substantially transmit light having a first polarization state and substantially reflect light having an orthogonal second polarization state. In some embodiments, the first polarization state is S polarization state and the second polarization state is P polarization state. In some other embodiments, the first polarization state is P polarization state and the second polarization state is S polarization state. In some embodiments, the reflective polarizer 105 includes one or more of a multilayer polymeric reflective polarizer, a wire grid reflective polarizer, and a diffuse reflective polarizer.

The diffusing layer 106 is disposed on the reflective polarizer 105 opposite to the light valve 104. In some embodiments, the diffusing layer 106 and the reflective polarizer 105 are bonded together, for example, by means of an optically clear adhesive, epoxy, lamination, or any other suitable method of attachment. In some embodiments, the diffusing layer 106 includes at least one of a diffusive coating layer and a polymer dispersed liquid crystal (PDLC) layer. In some embodiments, the diffusing layer 106 further includes a coating sheet. In some embodiments, the diffusing layer 106 includes a colored sheet. In some embodiments, the colored sheet may be white. In some other embodiments, the colored sheet may be of any other color as per application requirements. In some embodiments, the diffusing layer 106 may include a printed layer. The printed layer may include patterns or pictures.

In some embodiments, the LCLV includes a first polarizer 107, a second polarizer 108, and a liquid crystal layer 111.

The first polarizer 107 faces the display device 103. The first polarizer 107 is configured to substantially transmit light having the second polarization state and substantially reflect or absorb light having the first polarization state. In some embodiments, the first polarizer 107 may be a reflective polarizer. In some other embodiments, the first polarizer 107 may be an absorptive polarizer.

The second polarizer 108 faces the reflective polarizer 105. The second polarizer 108 is configured to substantially transmit light having the first polarization state and substantially reflect or absorb light having the second polarization state. In some embodiments, the second polarizer 108 may be a reflective polarizer. In some other embodiments, the second polarizer 108 may be an absorptive polarizer.

The liquid crystal layer 111 is disposed between the first polarizer 107 and the second polarizer 108.

Referring to FIGS. 1 and 2, the display device 103 may be powered off (off-state) or powered on (on-state). In the off-state, the display device 103 is powered off. In the off-state, the light valve 104 is in the block mode. In the block mode, the light valve 104 blocks the transmission of light from both the non-active display area 101 and the active display area 102 of the display device 103. Further, the reflective polarizer 105 disposed on the light valve 104 opposite to the display device 103 and the diffusing layer 106 disposed on the reflective polarizer 105 opposite to the light valve 104 further reduce the transmission of light from both the non-active display area 101 and the active display area 102 of the display device 103. In some embodiments, in the off-state, the diffusing layer 106 also operates in a diffusive state or the opaque state. The article 110 including the light valve 104, the reflective polarizer 105, and the diffusing layer 106 may greatly reduce a color contrast between the non-active display area 101 and the active display area 102. The article 110 provides better uniformity between the non-active display area 101 and the active display area 102 in the off-state compared to conventional displays including only a diffusing layer since a diffusing layer may allow substantial transmission of light in the diffusive state.

In the on-state, the display device 103 is powered on and substantially transmits light having the second polarization state. In the on-state, the light valve 104 is in the pass mode. In the pass mode, the light valve 104 allows the transmission of light from the active display area 102 of the display device 103. The light valve 104 may operate efficiently with the polarized light and hence does not affect the brightness of the active display area 102 in the on-state.

The first polarizer 107 facing the display device 103 substantially transmits light having the second polarization state and substantially reflects or absorbs light having the first polarization state. The display device 103 and the first polarizer 107 may be aligned to obtain optimal optical performance of the display device 103 in the on-state. In some embodiments, a bias angle between the display device 103 and the first polarizer 107 may be less than about 30 degrees, less than about 40 degrees, less than about 45 degrees, or less than about 50 degrees.

The second polarizer 108 facing the reflective polarizer 105 substantially transmits light having the first polarization state and substantially reflects or absorbs light having the second polarization state. The reflective polarizer 105 disposed on the light valve 104 opposite to the display device 103 substantially transmits light having the first polarization state and substantially reflects light having the second polarization state. The second polarizer 108 and the reflective polarizer 105 may be aligned to obtain optimal optical performance of the display device 103 in the on-state. In some embodiments, a bias angle between the second polarizer 108 and the reflective polarizer 105 may be less than about 30 degrees, less than about 40 degrees, less than about 45 degrees, or less than about 50 degrees. In some embodiments, the first polarization state is S polarization state and the second polarization state is P polarization state. In some other embodiments, the first polarization state is P polarization state and the second polarization state is S polarization state.

Figure 3:
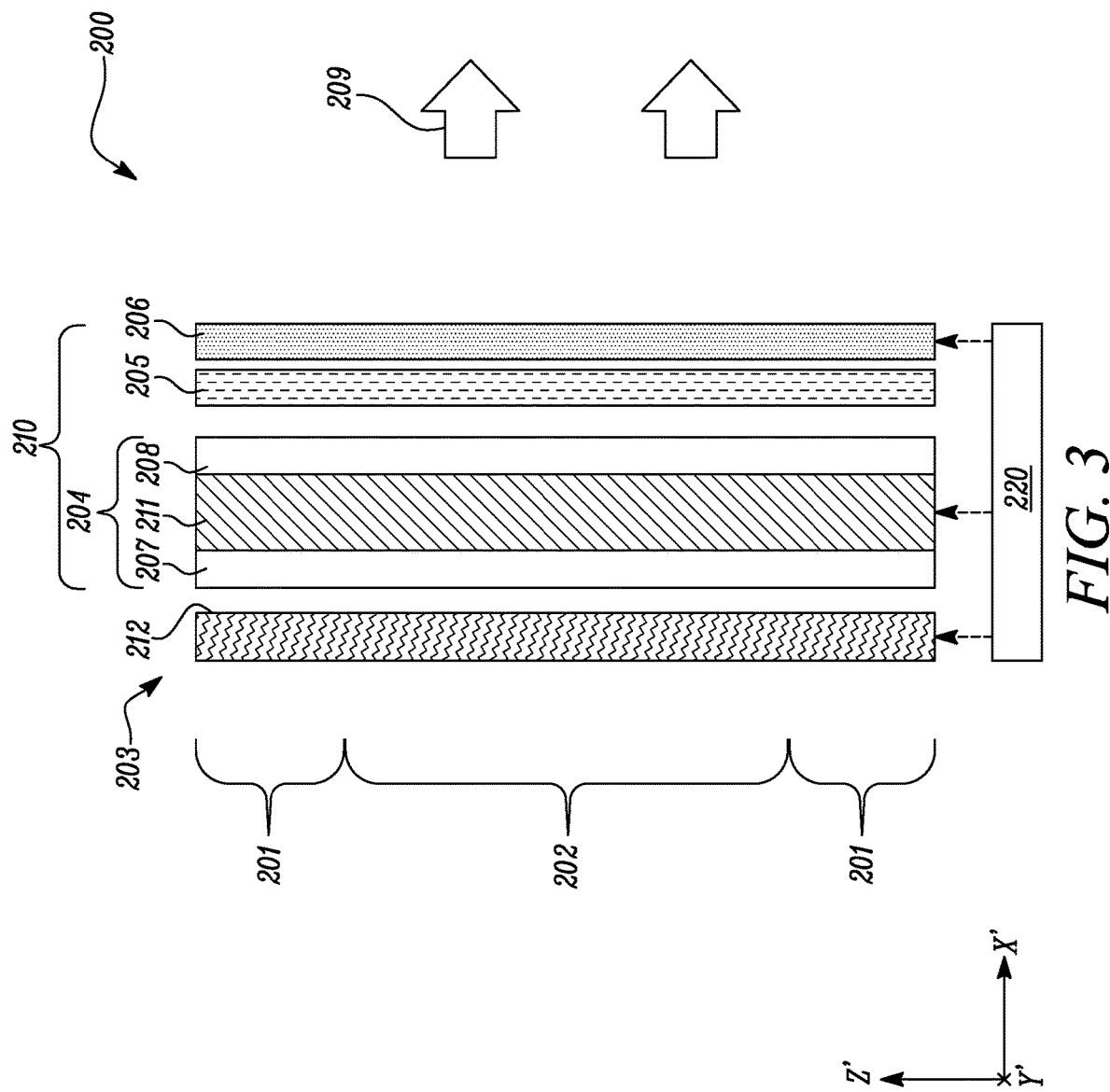
FIG. 3 illustrates an exploded cross-sectional view of a display system according to another embodiment of the present disclosure.

FIG. 3 illustrates an exploded cross-sectional view of a display system 200. The display system 200 includes a display device 203, an article 210, and a controller 220.

The display device 203 generates an image. The display device 203 has an output surface 212 facing a viewer or a user. The display device 203 includes a non-active display area 201 and an active display area 202. The image is generated in at least a portion of the active display area 202. The output surface 212 of the display device 203 includes the non-active display area 201 and the active display area 202. The active display area 202 emits light in a direction shown by arrow 209.

The article 210 includes a light valve 204, a reflective polarizer 205, and a diffusing layer 206. The article 210 is substantially similar to the article 110 of FIG. 1 with each of features 204 to 211 corresponding to equivalent features 104 to 111 of the article 110.

The display system 200 defines mutually orthogonal X', Y' and Z'-axes. The X' and Y'-axes are in-plane axes of the display system 200, while the Z'-axis is a transverse axis disposed along a thickness of the display system 200. In other words, the X' and Y'-axes are disposed along a plane of the display system 200, while the Z'-axis is perpendicular to the plane of the display system 200. The display device 203, and the article 210 of the display system 200 are disposed adjacent to each other along the Z'-axis. In some embodiments, a cross-sectional area of the article 210 is substantially equal to an area of the output surface 212 of the display device 203.

The light valve 204 is disposed on the output surface 212 of the display device 203. Further, the light valve 204 is operable in a pass mode and a block mode. In some embodiments, the light valve 204 includes a LCLV. In some other embodiments, the light valve 204 includes an electrochromic valve.

The reflective polarizer 205 is disposed on the light valve 204 opposite to the display device 203. The reflective polarizer 205 is configured to substantially transmit light having the first polarization state and substantially reflect light having the orthogonal second polarization state. In some embodiments, the first polarization state is S polarization state and the second polarization state is P polarization state. In some other embodiments, the first polarization state is P polarization state and the second polarization state is S polarization state. In some embodiments, the reflective polarizer 205 includes one or more of a multilayer polymeric reflective polarizer, a wire grid reflective polarizer, and a diffuse reflective polarizer.

The diffusing layer 206 is disposed on the reflective polarizer 205 opposite to the light valve 204. In some embodiments, the diffusing layer 206 and the reflective polarizer 205 are bonded together, for example, by means of an optical adhesive, epoxy, lamination, or any other suitable method of attachment. In some embodiments, the diffusing layer 206 includes at least one of a diffusive coating layer and a PDLC layer. In some embodiments, the diffusing layer 206 further includes a colored sheet. In some embodiments, the colored sheet may be white. In some other embodiments, the colored sheet may be of any other color as per application requirements. In some embodiments, the diffusing layer 206 may include a printed layer. The printed layer may include patterns or pictures.

The controller 220 is communicatively coupled to the light valve 204. The controller 220 is operable to at least switch the light valve 204 between the pass mode and the block mode. The controller 220 switches the light valve 204 to the pass mode when the display system 200 is powered on. The controller 220 switches the light valve 204 to the block mode when the display system 200 is powered off. In some embodiments, the controller 220 is communicatively coupled to the display device 203 and the light valve 204. The controller 220 may be operable to control both the display device 203 and the light valve 204. In some embodiments, the controller 220 is further communicatively coupled to the diffusing layer 206. The controller 220 may be operable to at least switch the diffusing layer 206 between a transparent state and an opaque state. In some embodiments, the controller 220 controls diffusivity of the diffusing layer 206 to a relatively high level during the opaque state and to a relatively low level during the transparent state.

The controller 220 may include a processor (not shown) and a memory (not shown). The memory may include computer executable instructions that are executable by the processor to perform a logic associated with the controller 220. In an example, the controller 220 may include analog-to-digital converters to process the signals from the various components of the display system 200.

The processor and the memory may be in communication with each other. The processor may be in communication with additional components. The processor may be any device that performs logic operations. The processor may include a general processor, a central processing unit, an application specific integrated circuit (ASIC), a digital signal processor, a field programmable gate array (FPGA), a digital circuit, an analog circuit, a controller, a microcontroller, any other type of processor, or any combination thereof. The processor may include one or more components operable to execute computer executable instructions or computer code embodied in the memory.

The logic associated with the controller 220 may be implemented in one or more modules including hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory, for example, that includes instructions executable with the processor or other processor to implement one or more of the features of the module. When any one of the modules includes the portion of the memory that includes instructions executable with the processor, the module may or may not include the processor. In some examples, each module may just be the portion of the memory or other physical memory that includes instructions executable with the processor or other processor to implement the logic of the corresponding module without the module including any other hardware.

Some of the features of the controller 220 may be stored in a computer readable storage medium (for example, as logic implemented as computer executable instructions or as data structures in memory). All or part of the controller 220 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the controller 220 may be distributed among multiple entities, such as among multiple processors and memories, optionally including multiple distributed processing systems. Additionally, peripheral interfaces (not shown) may be provided.

In some embodiments, the LCLV includes a first polarizer 207, a second polarizer 208, and a liquid crystal layer 211. The first polarizer 207 faces the display device 203. The first polarizer 207 is configured to substantially transmit light having the second polarization state and substantially reflect or absorb light having the first polarization state. The second polarizer 208 faces the reflective polarizer 205. The second polarizer 208 is configured to substantially transmit light having the first polarization state and substantially reflect or absorb light having the second polarization state. The liquid crystal layer 211 is disposed between the first polarizer 207 and the second polarizer 208.

Figure 4:
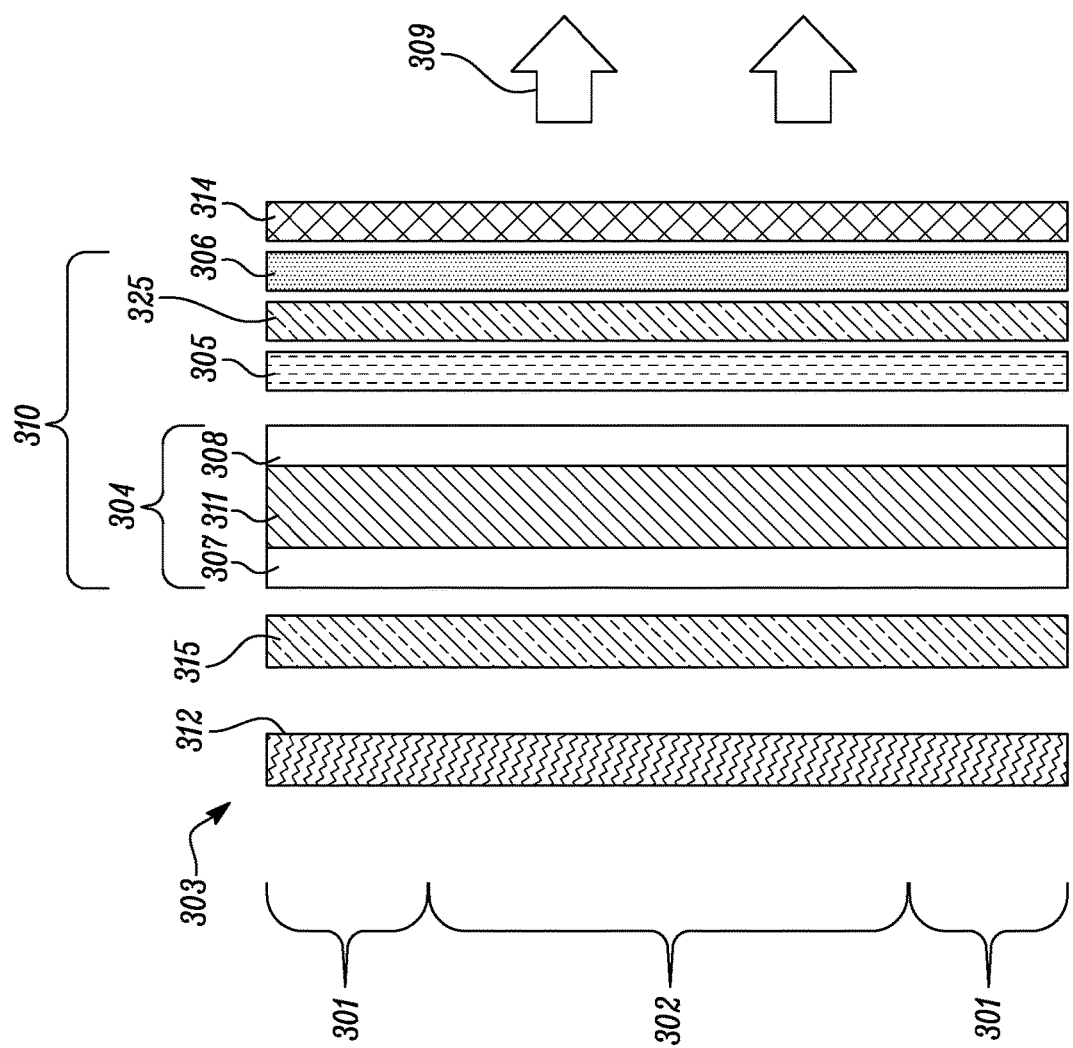
FIG. 4 is an exploded cross-sectional view further illustrating optically adhesive layers in a display system according to another embodiment of the present disclosure.

FIG. 4 illustrates an exploded cross-sectional view of an article 310 and a display device 303 according to another embodiment of the present disclosure. The display device 303 has an output surface 312 facing a viewer or a user. The output surface 312 of the display device 303 includes the non-active display area 301 and the active display area 302. The active display area 302 emits light in a direction shown by arrow 309.

The article 310 is used with the display device 303. The article 310 is substantially similar to the article 110 of FIG. 1 with each of features 304 to 311 corresponding to equivalent features 104 to 111 of the article 110.

In the illustrated embodiment of FIG. 4, an optically clear adhesive 315 bonds the display device 303 to the article 310. Further, the article 310 includes an optically clear adhesive 325 bonding the reflective polarizer 305 to the diffusing layer 306.

The article 310 includes a transparent cover layer 314 disposed on the diffusing layer 306. In some embodiments, the transparent cover layer 314 includes a touch panel. The touch panel may facilitate interaction by a user.

Figure 7:
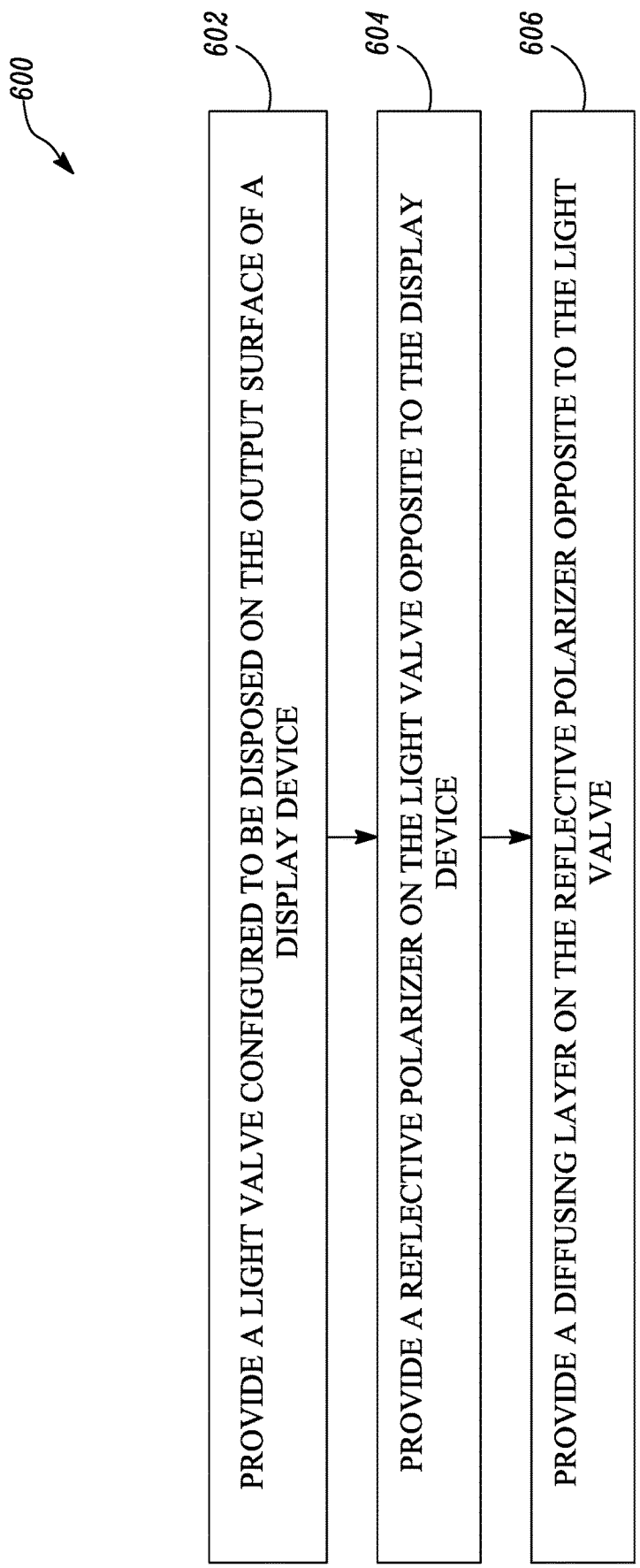
FIG. 7 is a flowchart for a method of manufacturing an article for use with a display device according to an embodiment of the present disclosure.

Referring to FIG. 7, the present disclosure further provides a method 600 of manufacturing the article 110 for use with the display device 103 shown in FIGS. 1 and 2. The method 110 may also be used to manufacture the articles 210, 310 shown in FIGS. 3 and 4, respectively.

At step 602, the method 600 includes providing the light valve 104 configured to be disposed on the output surface 112 of the display device 103. The light valve 104 is operable in the pass mode and the block mode.

At step 604, the method 600 further includes providing the reflective polarizer 105 on the light valve 104 opposite to the display device 103. The reflective polarizer 105 is configured to substantially transmit light having the first polarization state and substantially reflect light having the second polarization state.

At step 606, the method 600 further includes providing the diffusing layer 106 on the reflective polarizer 105 opposite to the light valve 104. In some embodiments, the method 600 further includes bonding the reflective polarizer 105 to the diffusing layer 106 by an optically clear adhesive.

The disclosure is further described with reference to the following examples.

Example 1

Optical Test on Prototypes with Reflective Polarizer

In this example, first and second prototypes were tested in both off-status and on-status.

The first prototype was a display system including a typical liquid crystal display (LCD) display. The display system further included a liquid crystal light valve (LCLV) commercially available from e-commerce (Taobao.com). The display system further included a reflective polarizer, such as a Display Camouflage Film-visible (DCF-vis) from 3M, printed with a white diffusive layer. The reflective polarizer was disposed on the LCLV. The LCLV included a first polarizer facing the LCD display and a second polarizer facing the reflective polarizer. The first and second polarizers were orthogonal polarizers with a liquid crystal sealed in between the first and second polarizers. The polarization axis of the first polarizer was aligned with the polarization axis of the LCD display. The polarization angle of the second polarizer was same as the polarization angle of the reflective polarizer to get best optical performance. The LCLV was controlled by a control unit to switch between pass or block modes: normally pass mode in power-on and block mode in power-off.

The second prototype was the display system similar to the first prototype, but did not include a LCLV. The polarization angle of the reflective polarizer was same as the polarization angle of the LCD display.

In the off-status, the LCD display was powered off. For better test results on sample color information, color (L a b) value test (test method provided below) used a white polyethylene terephthalate (PET) as frame part, and a polarizer on a black cover as display. In this status, the LCLV was in light block mode. The color value L* a* b* was measured by a spectrophotometer in a reflective mode. The result is shown as below Table 1.

TABLE 1

Color information test result

| Test sample | Film structure | L* | a* | b* | Color contrast |
|---|---|---|---|---|---|
| Original color | Original white frame | 95.20 | −1.26 | −2.80 | ΔE = 59.48 |
|  | Original black display | 35.92 | −0.82 | 2.14 |  |
| First prototype | White frame part | 85.06 | −1.13 | 0.65 | ΔE = 0.06 |
|  | Black display part | 85.04 | −1.18 | 0.62 |  |
| Second prototype | White frame part | 94.62 | −1.29 | −0.93 | ΔE = 13.96 |
|  | Black display part | 80.76 | −1.53 | −2.57 |  |

It was noticed that the color contrast ΔE from the original frame and the display was as high as 59.48. However, in the second prototype, the ΔE decreased greatly to 13.96, which was still obvious for human eyes to notice. But in the display system of the first prototype, ΔE was only about 0.06, which was very hard for naked eye to distinguish.

Figure 5:
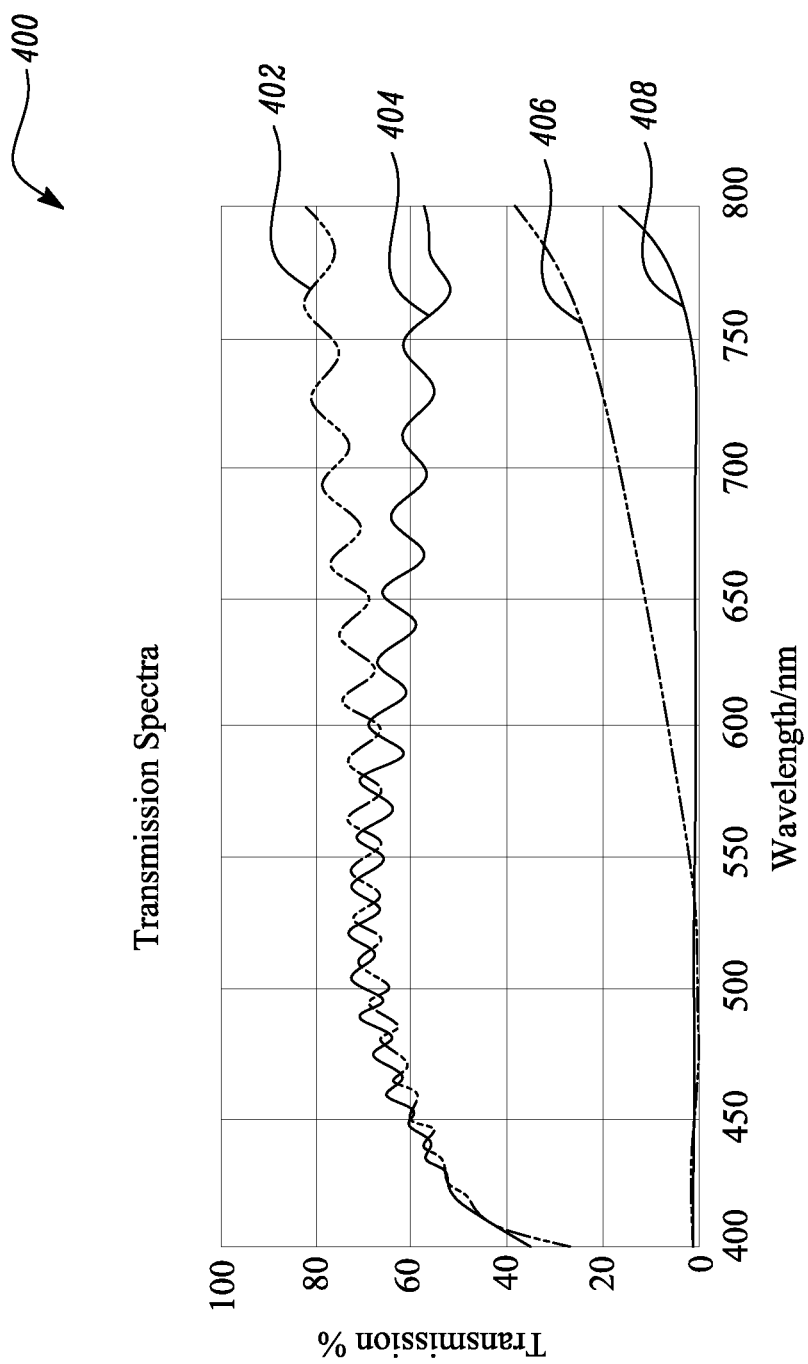
FIG. 5 is a graph illustrating exemplary transmission spectra of two light valves.

In on-status, since the first prototype has only a light valve (LCLV) in addition to the second prototype, the transmission of the light valve (LCLV) in on-status seems to be very critical. FIG. 5 is a graph 400 illustrating transmission spectra of two light valves, i.e., a first light valve and a second light valve. FIG. 5 illustrates transmission spectra 402 and 406 of the first light valve in pass and block modes, respectively. FIG. 5 further illustrates transmission spectra 404 and 408 of the second light valve in pass and block modes, respectively. An average transmission of the first light valve was 68.77% and an average transmission of the second light valve was 61.11%.

Example 2

Optical Test on Prototypes with Reflective Polarizer and PDLC Layer

As example 1, we needed to test performance of two other prototypes (third and fourth) in both off-status and on-status. In this example, a PDLC layer replaced the white diffusive layer in example 1. The advantage of the PDLC layer is that the PDLC layer is switchable between a diffusive mode having white color and a transparent mode.

The third prototype was a display system including a typical LCD display. The display system further included a LCLV. The display system further included a reflective polarizer, such as DCF-vis. The reflective polarizer was disposed on the LCLV. A PDLC layer is laminated on the reflective polarizer as a switchable diffusive layer for top appearance. The LCLV included a first polarizer facing the LCD display and a second polarizer facing the reflective polarizer. The first and second polarizers were orthogonal polarizers with a liquid crystal sealed in between the first and second polarizers. Polarization axis of the first polarizer was aligned with the polarization axis of the LCD display. Polarization angle of the second polarizer was same as polarization angle of the reflective polarizer to obtain optimal optical performance. The LCLV was controlled by a control unit to switch between pass or block modes: normally pass mode in power-on and block mode in power-off.

The fourth prototype was the display system similar to the third prototype, but did not include a LCLV. Polarization angle of the reflective polarizer was same as polarization angle of the LCD display.

In the off-status, the LCD display was powered off. For better test results on sample color information, color (L a b) value test used a white PET as frame part, and a polarizer on a black cover as display. In this status, the LCLV was in light block mode and the PDLC was in a diffusive mode to appear white in color. The color value L* a* b* was measured by a spectrophotometer in a reflective mode. The result is shown as below Table 1.

TABLE 2

Color information test result

| Test sample | Film structure | L* | a* | b* | Color contrast |
|---|---|---|---|---|---|
| Original color | Original white frame | 95.20 | −1.26 | −2.80 | ΔE = 59.48 |
|  | Original black display | 35.92 | −0.82 | 2.14 |  |
| Third prototype | White frame part | 77.66 | −2.78 | 3.31 | ΔE = 0.07 |
|  | Black display part | 77.63 | −2.82 | 3.28 |  |
| Fourth prototype | White frame part | 94.62 | −1.29 | −0.93 | ΔE = 11.58 |
|  | Black display part | 80.76 | −1.53 | −2.57 |  |

It was noticed that the display system of the third prototype also provided better uniformity as the color contrast ΔE=0.07, which was very hard for naked eye to distinguish. The fourth prototype still had ΔE=11.58 as noticeable contrast. In this example, L value was greatly diminished and can further be improved by controlling the diffusivity of the PDLC.

Figure 6:
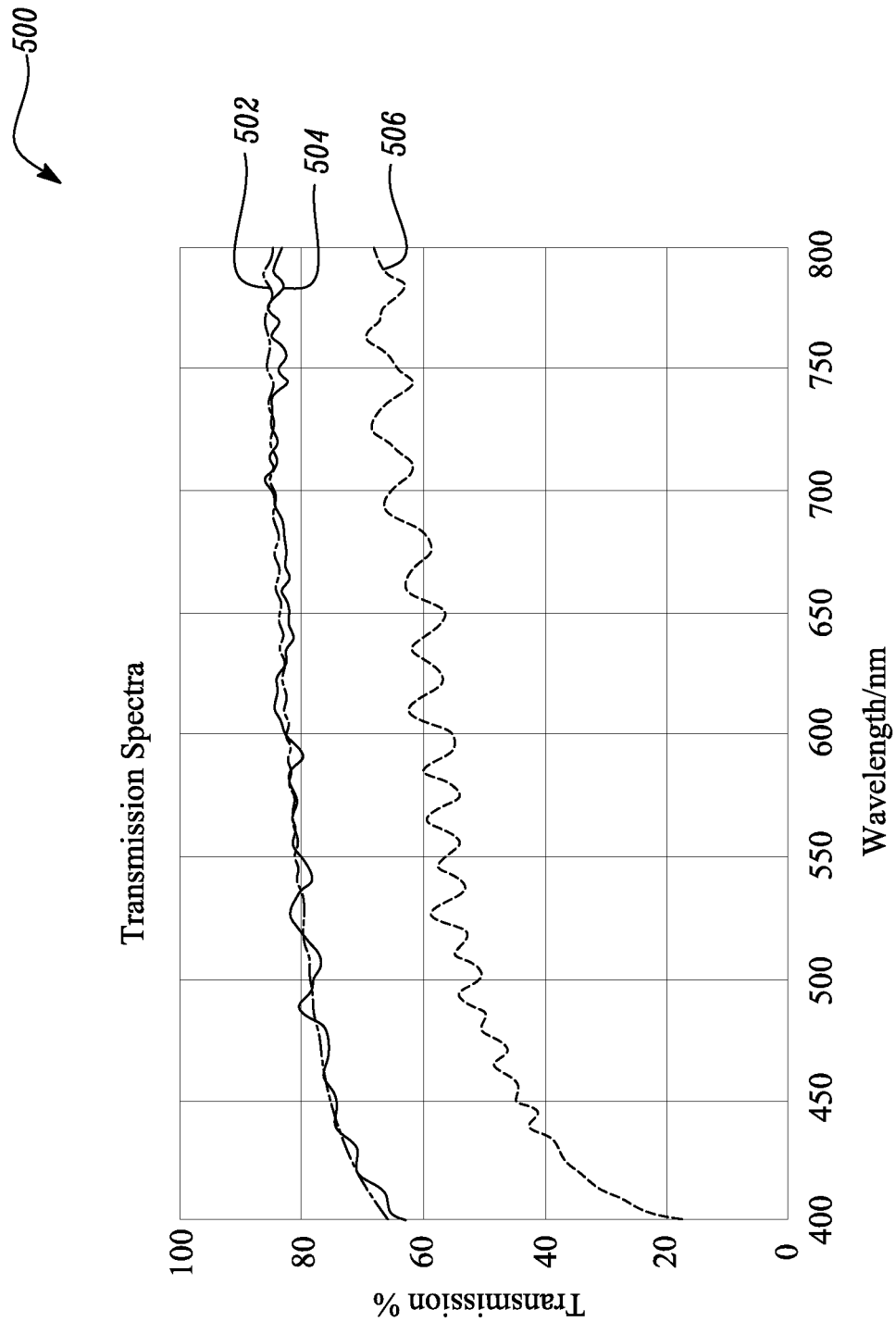
FIG. 6 is a graph illustrating exemplary transmission spectra of different articles.

In on-status, LCLV was in the pass mode and PDLC was in the transmission mode. Similar to example 1, both third and fourth prototypes were tested (Color (L a b) value test). FIG. 6 is a graph 500 illustrating transmission spectra 502 of only PDLC layer, transmission spectra 504 of DCF-vis and PDLC layer, and transmission spectra 506 of DCF-vis and PDLC layer and LCLV. Only PDLC layer had 81.03% transmission. Further, DCF-vis and PDLC layer made no big difference on the transmission, which was >80%. When LCLV was added, more than 50% brightness was obtained as a result.

Test Method

1. Color (L a b) Value Test

Color test is used to characterize the camouflage performance in display off-status.

The color of the film is tested by a spectrophotometer named CM-3700D by Konica Minolta, in reflective mode. Light is projected onto the printed side of film.

The reflective mode is chosen to characterize the color performance, which demonstrates the off-status color of the panel. The color which people saw the panel is from the light reflected from environment. For better simulation of the application case, the DCF-vis is covered by a polarizer with black cover on the other side.

2. Transmission Rate Test

Transmission rate test is used to characterize the performance when display operates in on-status.

The transmission spectra of a film is tested by a spectrometer called Lambda 950, by Perkin Elmer Company. The light source is polarized by a polarizing crystal accessory. In the transmission rate test, the polarization angle of polarized light has to be parallel to pass axis of the polarization angle of the first layer of the LCLV', or DCF-vis if no LCLV is applied in contrast application.

The transmission mode is chosen to characterize the brightness, which demonstrates the on-status performance of the panel. As described before, the light emitted from display was polarized, and the film is in front of the panel. The image people can see from the panel depends on how much light is passed through the film, especially in visible range.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

LIST OF ELEMENTS

103 Display Device
101 Non-Active Display Area
102 Active Display Area
110 Article
104 Light Valve
105 Reflective Polarizer
106 Diffusing Layer
107 First Polarizer
108 Second Polarizer
109 Arrow
111 Liquid Crystal Layer
112 Output surface
X Axis
Y Axis
Z Axis
200 Display System
203 Display Device
201 Non-Active Display Area
202 Active Display Area
210 Article
204 Light Valve
205 Reflective Polarizer
206 Diffusing Layer
207 First Polarizer
208 Second Polarizer
209 Arrow
211 Liquid Crystal Layer
212 Output surface
220 Controller
X' Axis
Y' Axis
Z' Axis
303 Display Device
301 Non-Active Display Area
302 Active Display Area
310 Article
304 Light Valve 305 Reflective Polarizer
306 Diffusing Layer
307 First Polarizer
308 Second Polarizer
309 Arrow
311 Liquid Crystal Layer
312 Output surface
314 Cover Layer
315 Optically Clear Adhesive
325 Optically Clear Adhesive
400 Graph
402 Transmission Spectra
404 Transmission Spectra
406 Transmission Spectra
408 Transmission Spectra
500 Graph
502 Transmission Spectra
504 Transmission Spectra
506 Transmission Spectra
508 Transmission Spectra
600 Method
602 Step
604 Step
606 Step

The invention claimed is:

1. A display system comprising:
a display device comprising an output surface configured to face a viewer and comprising an active display area for generating an image for viewing by the viewer and a non-active display area surrounding the active display area; and
a reflective polarizer disposed on the output surface of the display between the display device and the viewer, the reflective polarizer covering both the active display area and the non-active display area and configured to substantially transmit light having a first polarization state and substantially reflect light having an orthogonal second polarization state.

2. The display system of claim 1, wherein the reflective polarizer comprises one or more of a multilayer polymeric reflective polarizer, a wire grid reflective polarizer, and a diffuse reflective polarizer.

3. The display system of claim 1 further comprising a light valve disposed between the output surface and the reflective polarizer and operable in a pass mode and a block mode; the light valve covering both the active display area and the non-active display area.

4. The display system of claim 3, wherein the light valve comprises one or more of a liquid crystal light valve and an electrochromic light valve.

* * * * *